Figure 1:
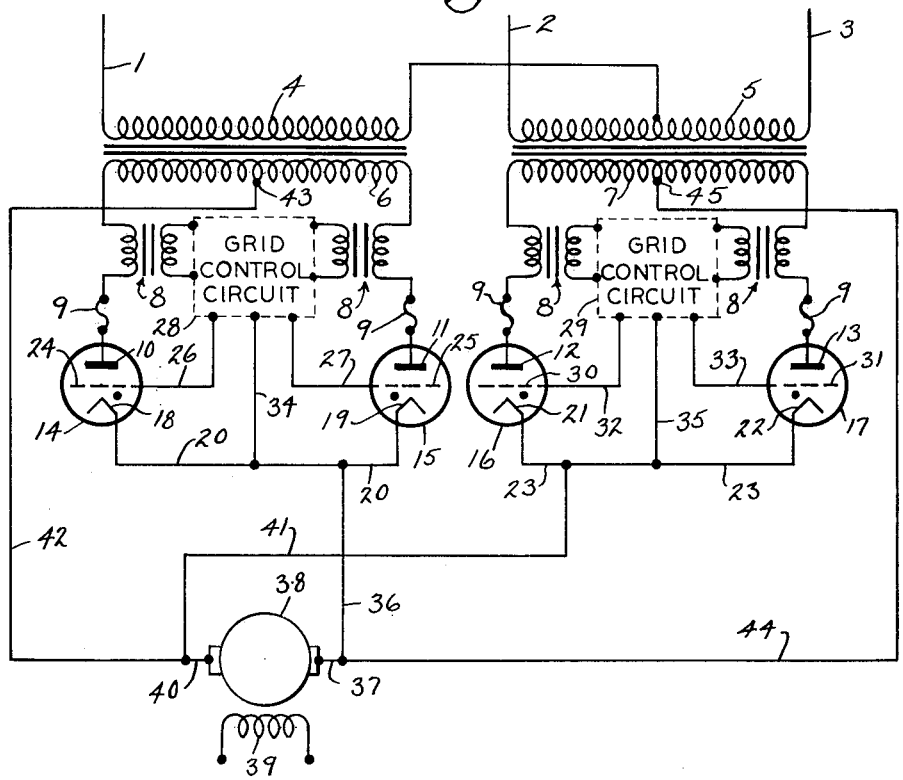

March 14, 1961  J. E. CALLAN ET AL  2,975,348
DIRECT CURRENT MOTOR CONTROL APPARATUS
Filed Sept. 12, 1958                                    5 Sheets-Sheet 1

INVENTORS
JOHN E. CALLAN
WILLIAM J. HUDSON

BY Quarles, Fox, Seidel,
Bateman & Hvar

ATTORNEYS

THYRATRON — 15

THYRATRON — 15

THYRATRON — 16

THYRATRON — 16

THYRATRON — 17

THYRATRON — 17

INVENTORS
JOHN E. CALLAN
WILLIAM J. HUDSON

BY Quarles, Fox, Seidel,
Bateman & Hoar

ATTORNEYS

March 14, 1961    J. E. CALLAN ET AL    2,975,348
DIRECT CURRENT MOTOR CONTROL APPARATUS
Filed Sept. 12, 1958    5 Sheets-Sheet 4

THYRATRON -88

THYRATRON -89

THYRATRON -99

THYRATRON -100

THYRATRON -101

THYRATRON -102

INVENTORS
JOHN E. CALLAN
WILLIAM J. HUDSON

BY Quarles, Fox, Seidel,
Bateman & Hoar

ATTORNEYS

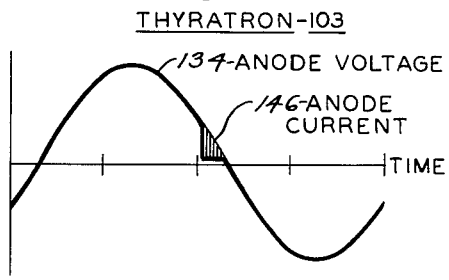
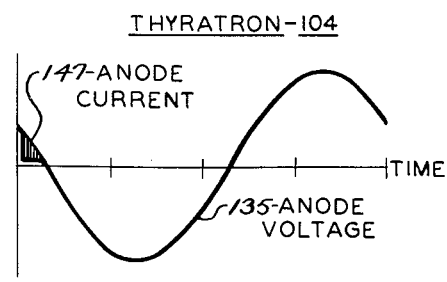
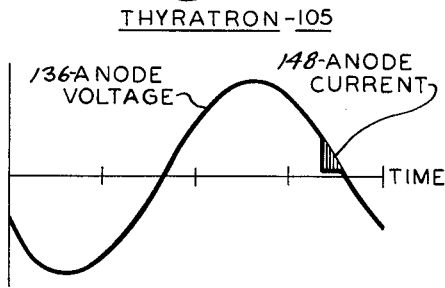
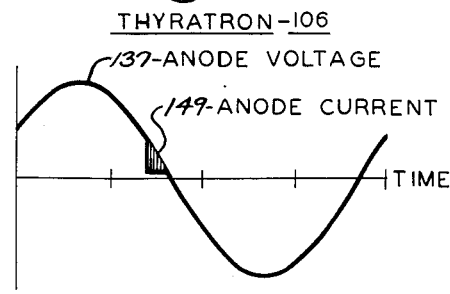
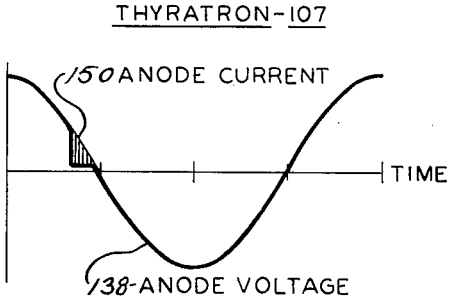
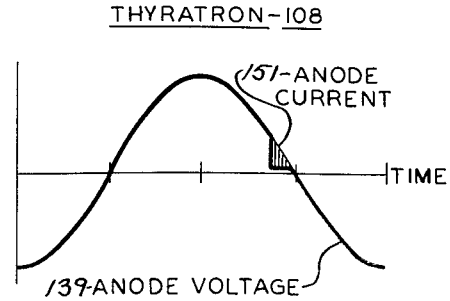

United States Patent Office 2,975,348
Patented Mar. 14, 1961

2,975,348

DIRECT CURRENT MOTOR CONTROL APPARATUS

John E. Callan and William J. Hudson, Milwaukee, Wis., assignors to Allen-Bradley Company, Milwaukee, Wis., a corporation of Wisconsin Filed Sept. 12, 1958, Ser. No. 760,586

7 Claims. (Cl. 318—257)

This invention relates to direct current motor control apparatus and it more particularly resides in a stepless speed control and reversing apparatus comprising a voltage orientating network connectible to an alternating current source to supply voltages of differing phase angles to a plurality of grid controlled electrical valves, said valves being connectible to a reversible direct current motor or the like to supply full wave rectified currents for either direction of rotation through regulation of a grid control circuit.

In various applications for reversible direct current motors such as precision machine tools and training control systems including military signaling apparatus, automatic gun controls, and radar screens, there has been a constant demand for a reversing variable speed drive capable of producing a smooth transition from forward to reverse rotation and vice versa. Step type contactors, which are adaptable for specific purposes, fail to provide for gradual increases and decreases in the current supplied to the armature or field of direct current motor, and hence are inadequate where steady increases and decreases in the rate of rotation of the motor armature are required.

Motor generator sets and amplidynes have been utilized for the purpose of supplying stepless variations in current to direct current motors, however such means can only be used to advantage where the size and weight of the equipment are not objectionable. Special half wave grid controlled electrical valve circuits arranged to provide stepless control for motors have also been employed, however, such circuits are subject to numerous disadvantages characteristic of half wave operation as compared to full wave operation. Among such disadvantages are that the use of half wave rectified current for supplying direct current motors causes additional motor heating and the complexity of the grid control circuit associated with the valves is considerably increased.

Full wave operation of electrical valves, as for example, thyratrons, for supplying current to the armature of a direct current motor has often been attempted but with only limited degrees of success. For smooth reversal of motor rotation, it is necessary that the armature current be controllable from a positive value through zero to a negative value as a continuous function of the input signal applied to the thyratron grids. This would dictate that the two or more tubes which supply rectified full wave current for one direction of motor rotation must continue to fire until the motor reaches a standstill, at which time the two or more tubes which supply rectified full wave current for the opposite direction of motor rotation must instantly fire to pick up the speed in the reverse direction. Such precise timing is not readily achieved, however, and all too frequently attempts to provide a substantially continuous supply of current to the motor have resulted in various tubes in both sets of thyratrons firing at the same instant of time when the motor armature is at or near standstill. This condition sets up paths for high value circulating currents which may be damaging to both electrical components in the circuit supplying the tubes and also to the tubes themselves when proper fusing is not provided. Further, it may be noted that even if the circuit could be operated so that only one set of thyratrons conducts at any given time the thyratron output voltage would have an unavoidable delay period due to an inherent dead zone between the minimum anode starting voltage of one set of thyratrons and the minimum anode starting voltage of the other set of thyratrons. It is to be observed from the foregoing discussion that the likelihood of a plurality of tubes firing at the same instant of time to supply rectified currents of both polarities at the motor exists primarly during periods of low current output, i.e. at slow motor speeds and particularly when the operated equipment is undergoing a reversal of direction. At all other times, i.e. during high speed operation, the current supplied to the operated equipment may be readily confined to a single set of tubes through the use of an associated grid control circuit.

The present invention is designed to overcome the deficiencies noted in earlier attempts to supply reversible direct current motors and the like with stepless and continuous currents during the transition from forward to reverse directions of rotation. Utilizing two sets of full wave connected thyratrons to supply direct current for either direction of motor operation, it has been found that by suitably phase shifting the anode voltages applied to the thyratrons, only those tubes arranged to furnish current for a particular direction of rotation may conduct at any given instant of time. Thus, even though grid turn on signals are applied to both sets of tubes arranged to furnish current of opposite polarity at the motor, conduction may be limited to tubes in only one set at any instant to prevent the formation of injurious circulating current paths in the apparatus.

It is an object of this invention to provide a thyratron full wave motor speed control and reversing apparatus in which only one of various thyratrons employed to supply a reversible motor for either direction of rotation is permitted to fire duing any given period of time at low motor speed operation.

It is a further object of this invention to provide an improved direct current motor reversing apparatus.

It is a further object of this invention to permit only one such thyratron to fire during any given period of time by supplying the anodes of the thyratrons with voltages which are displaced in phase from one another.

It is a further object of this invention to provide a thyratron full wave motor speed control and reversing apparatus in which currents effective to produce motor armature rotation of either direction may be continuously supplied to the motor during a transition from forward to reversed directions of armature rotation.

It is a further object of this invention to eliminate the possibility of circulating currents during the transition from conduction through one set of thyratrons to conduction through another set of thyratrons which are arranged to supply current to rotate a motor armature in opposite directions.

These and other objects and advantages of this invention may appear from the following description together with the accompanying drawings which show by way of illustration and not of limitation various embodiments of the invention.

Figure 2:
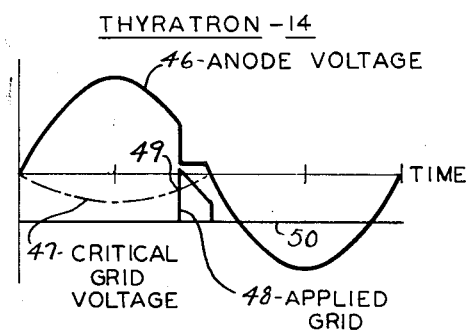
Figure 3:
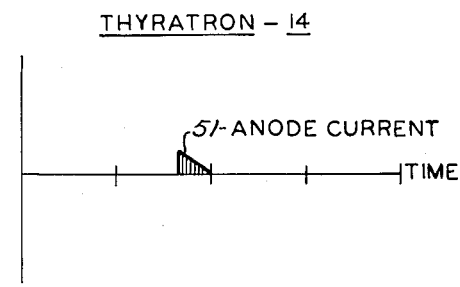
Figure 4:
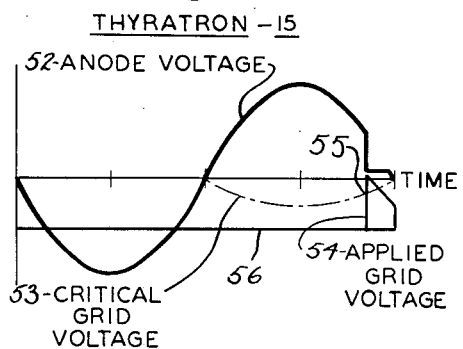
Figure 5:
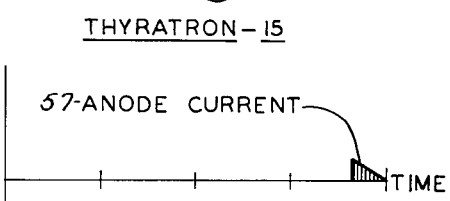
Figure 8:
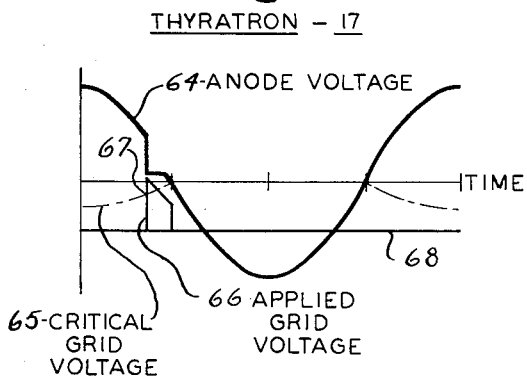
Figure 9:
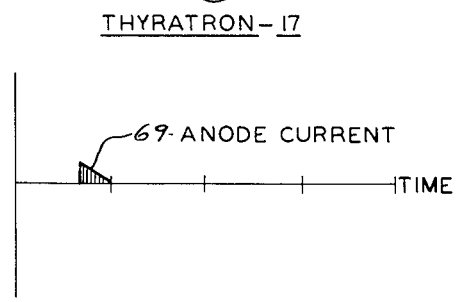
Figure 10:
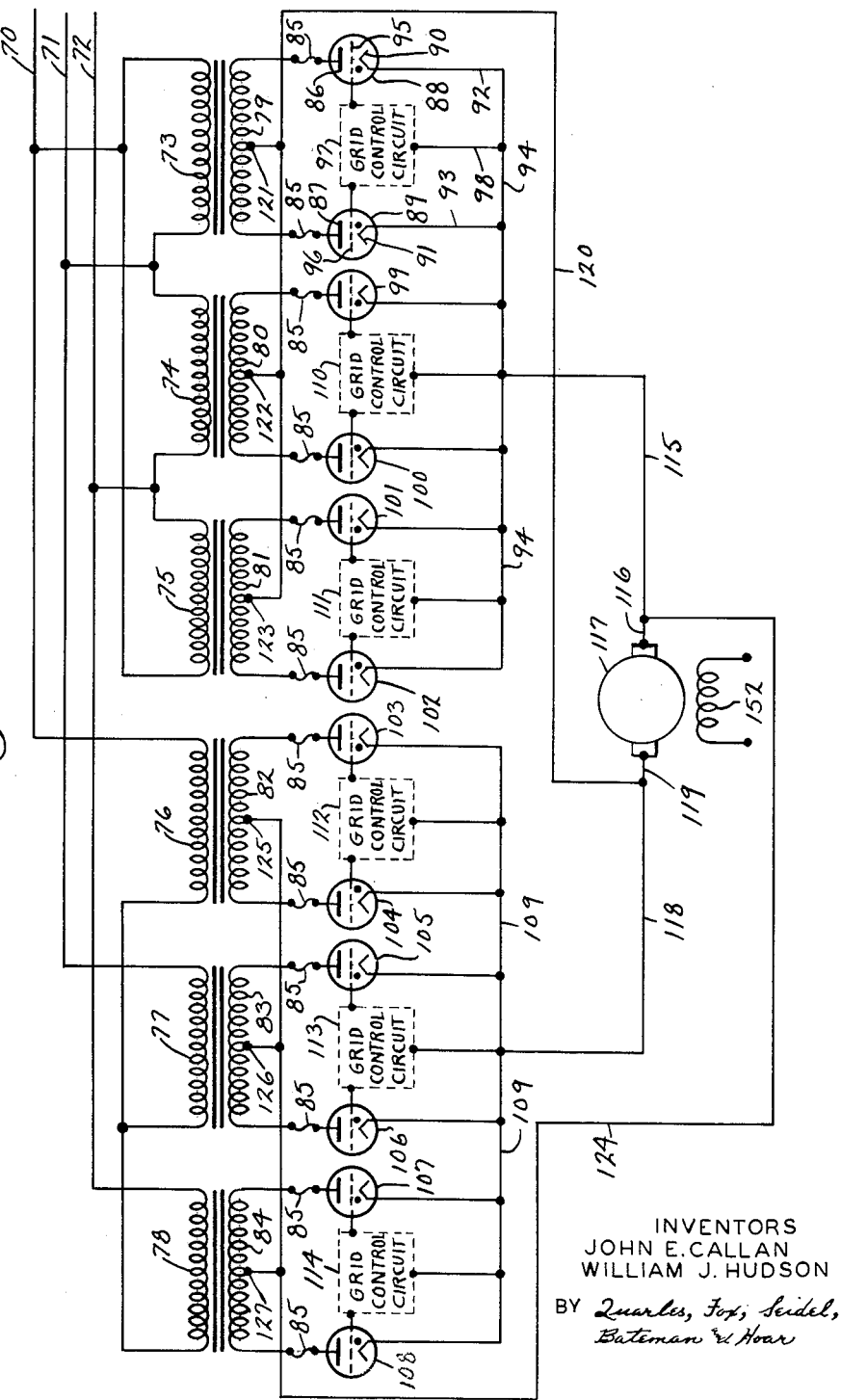
Figure 11:
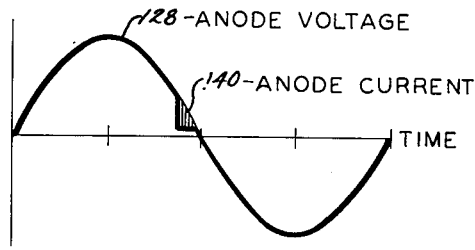
Figure 12:
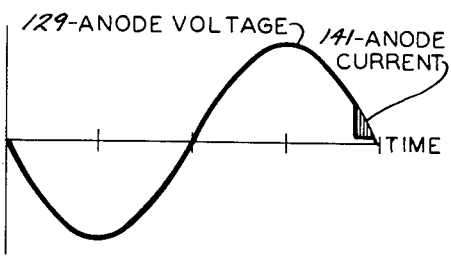
Figure 13:
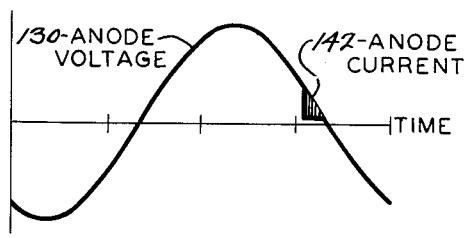
Figure 14:
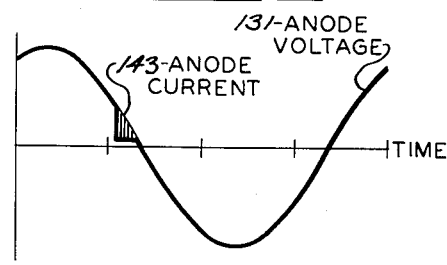
Figure 15:
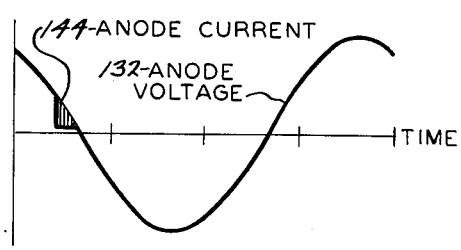
Figure 16:
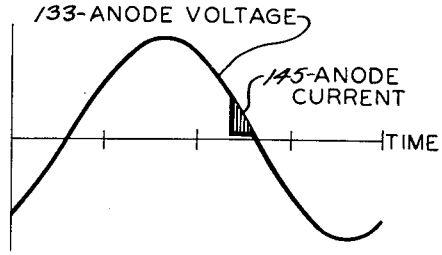

In the drawings:

Fig. 1 is a circuit diagram of one embodiment of the invention,

Fig. 2 illustrates curves of various voltages that may be impressed on one of the thyratrons shown in Fig. 1 for a particular period of time, as well as a critical grid voltage curve for the thyratron, Fig. 3 is a curve illustrating the current flowing through the same thyratron when subjected to the voltages illustrated in Fig. 2, Figs. 4 and 5 illustrate similar voltage and current conditions for another of the thyratrons during the same period of time as represented in Figs. 2 and 3, Figs. 6 and 7 illustrate similar voltage and current conditions for still another of the thyratrons illustrated in Fig. 1 during the same period of time represented in Figs. 2 and 3, Figs. 8 and 9 illustrate similar voltage and current conditions for still another of the thyratrons shown in Fig. 1 during the same period of time represented in Figs. 2 and 3, Fig. 10 is a circuit diagram of an alternative embodiment of the invention, Figs. 11 through 22 are curves illustrating anode to cathode voltages for the various thyratrons shown in Fig. 10 for a given period of time, and also illustrate the current conducted through each of such thyratrons.

Referring now to the drawings, there is shown in Fig. 1 a set of conductors 1, 2 and 3 connected to supply three phase alternating current from a source, not shown, to a pair of transformer primary windings 4 and 5. Windings 4 and 5 are T- or Scott-connected, with one side of winding 4 being connected to a center tap of winding 5. Both windings 4 and 5 are arranged in transformer relationship with a pair of secondary windings 6 and 7. When thus connected, and when the primary windings 4 and 5 are energized, power is transformed from a three phase condition at the source conductors 1, 2 and 3 to two phase at the output of the secondary windings 6 and 7. The voltage appearing across the secondary winding 6 is 90 degrees out of phase with the voltage appearing across the secondary winding 7.

From the ends of the secondary windings 6 and 7 electrical connections are made through the primary windings of current transformers 8 and fuses 9 to anode terminals 10, 11, 12 and 13 of thyratrons 14, 15, 16 and 17, respectively. The cathode terminals 18 and 19 of the thyratrons 14 and 15 are joined together by means of a conductor 20, and similarly, the cathodes 21 and 22 of thyratrons 16 and 17 are connected through a conductor 23. While reference herein is frequently made to a specific type of electrical valve, namely the thyratron, it is contemplated that any one of various types of rectifiers or electrical valves which may be controlled externally may be employed in the practice of this invention, as for example, grid controlled rectifiers, controllable dry type rectifiers, thyratrons, or their equivalents.

The grids 24 and 25 of thyratrons 14 and 15 are supplied from a diagrammatically illustrated grid control circuit 28 which is joined to the grids 24 and 25 through leads 26 and 27 and to the cathode connecting conductor 20 by means of lead 34. A similar grid control circuit 29 is employed to supply the grids 30 and 31 of thyratrons 16 and 17 through leads 32 and 33, and is connected to the cathode connecting conductor 23 by means of lead 35.

The grid circuits 28 and 29 do not form a part of this invention and may be of a type commonly employed to control conduction through similar grid controlled rectifiers in various other applications. Such circuits may include magnetic amplifiers for supplying turn on signal voltages to the thyratrons controlled thereby. It is contemplated that the grid control circuits 28 and 29 employed in conjunction with this invention may utilize currents flowing through the secondary windings of current transformers 8 which are connected to the circuits 28 and 29, to limit anode currents and to compensate for increased load demands, as in other applications known to the art. It is further contemplated that various other known types of circuitry, not shown in the figures, may be employed to feed back armature voltages into the grid control circuits 28 and 29 to provide additional regulation of the thyratrons 14, 15, 16 and 17.

From the cathode connecting conductor 20 a lead 36 extends to an armature input terminal 37 of a reversible direct current motor 38, which motor 38 is shown in diagrammatic form together with a separately excited field coil 39. Connected between the other armature terminal 40 of the motor 38 and the cathode connecting conductor 23 is a lead 41. Finally, a lead 42 extends from a center tap 43 of the secondary winding 6 to the armature terminal 40, while a similar lead 44 extends from a center tap 45 of secondary winding 7 to a connection with the armature terminal 37.

With each of the secondary windings 6 and 7 so arranged to supply the parallel connection of thyratrons 14 and 15, and 16 and 17, respectively, it may be observed that each set of tubes it capable of supplying a full wave rectified current to the motor 38. For example, when an alternating voltage is induced across the secondary winding 6, thyratron 14 can be made to conduct during the positive half cycle of alternation when its anode 10 is positive with respect to its cathode 18, while thyratron 15 may conduct during the negative half cycle when its anode 11 is positive with respect to its cathode 19. The grid control circuit 28 is adapted to initiate conduction by applying a positive potential to the grids 24 and 25 of each of the thyratrons 14 and 15, and depending on when such a potential is applied the period of conduction of each tube 14 and 15 is accordingly determined.

Similarly, when an alternating voltage is induced in winding 7, one or the other of the thyratrons 12 and 13 may be made to conduct for a period of time during each half cycle of voltage alternation. Thus, each parallel connection of thyratrons, namely, that comprising thyratrons 14 and 15 and that comprising thyratrons 16 and 17, may be regarded as a full wave rectifier adapted to supply full wave rectified current through conductors 36 and 41, respectively, to opposite armature terminals 37 and 40 of the motor 38.

When thyratrons 14 and 15 are conducting, a current will flow through the motor 38 which is effective to cause the armature of motor 38 to rotate in a particular predetermined direction. This current path is established through the following circuit elements: the cathode connecting conductor 20, the lead 36, the armature of motor 38, and the lead 42 which extends to a center tap 43 on the secondary winding 6. Similarly, when thyratrons 16 and 17 are conducting, a current path through the cathode connecting conductor 23, the lead 41, the armature of motor 38, and the lead 44, is effective to carry current through the motor 38 in an opposite direction to effect oppositely directed armature rotation.

As will be more fully discussed hereinafter, the length of the conduction period for each tube determines the average value of the current supplied to the motor, and hence determines the rotational speed of the armature. At high armature rotational speeds, the grid control circuits 28 and 29 may be effectively controlled to permit only one set of thyratrons to conduct at any time. However, at low rotational speeds, and particularly during the transition from one direction of rotation to another, it is desirable to permit both sets of thyratrons, 14 and 15, and 16 and 17, to conduct in order that the motor may be supplid with a continuously variable driving current. This situation, when tubes in both sets of thyratrons are conducting simultaneously, presents the serious danger of damaging circulating currents which this invention is designed to eliminate.

It may be observed that in a full wave thyratron circuit of the type described, if thyratrons 14 and 16, for example, are in a state of conduction at the same instant of time, circulating currents will flow through the conductor 20, the lead 36, the lead 44, a portion of the secondary winding 7, the thyratron 16, the conductor 23, the lead 41, the lead 42, a portion of the secondary winding 6, and the thyratron 14. Since the total included impedance in the path is small, the currents which circulate therethrough may be of extremely high value. Under such conditions, fuses 9 would normally operate to open the circuit before the windings 6 and 7 and thyratrons 14 and 16 are damaged, nevertheless the circuit is temporarily rendered inoperative.

This invention, therefore, is directed to the prevention of these and similar circulating currents as will appear more fully from Figs. 2–9.

In Fig. 2 there is illustrated a complete cycle of an alternating anode voltage 46 applied across the anode 10 and the cathode 18 of the thyratron 14. There is also shown a curve of a critical grid voltage 47 representing a voltage level for the positive half cycle of the anode voltage 46 which must be exceeded by an applied grid voltage 48 in order to initiate conduction through the tube 14. At point 49 the applied grid voltage signal 48, which is impressed on a negative bias voltage 50, is shown to intersect and thereafter become more positive than the critical grid voltage 47, thus enabling the thyratron 14 to fire. As is characteristic of such tubes, after conduction is initiated, the thyratron 14 continues to conduct independent of the grid voltage until the anode voltage 46 becomes negative. During conduction, the applied anode voltage 46 is reduced to a value determined by the internal impedance of the tube.

Fig. 3 illustrates an anode current 51 flowing through the thyratron 14 during the period of time when the tube is conducting. It may be observed that the length of time during which conduction occurs is illustrated as being only a fractional part of the period of time during which the applied anode voltage 46 is positive, since the commencement of conduction is delayed until the occurrence of the grid voltage signal 48. Such a condition may exist when it is desired to supply only relatively small average currents to the motor 38.

Figure 6:
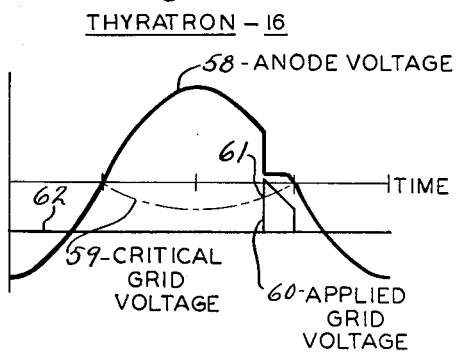
Figure 7:
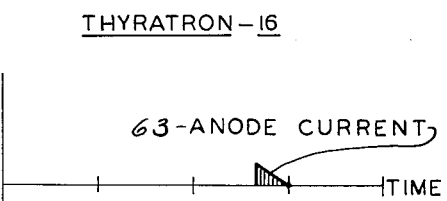

Figs. 4, 6 and 8 illustrate anode voltages 52, 58, 64 applied to the thyratrons 15, 16 and 17, respectively, during the same period of time as illustrated in Fig. 2, together with critical grid voltages 53, 59 and 65. There are also shown negative bias voltages 56, 62 and 68 as well as applied grid voltages 54, 60 and 66, the latter being effective to initiate conduction in each of the tubes, hence illustrating a condition during the transition from one direction of armature rotation to another when currents are simultaneously supplied from both sets of rectifiers to the motor 38. In Fig. 4 the applied anode voltage 52 of thyratron 15 is shown to be shifted 180 degrees from the applied anode voltage 46 of thyratron 14, illustrated in Fig. 2, due to the arrangement of thyratrons 14 and 15 at opposite ends of the secondary winding 6. In Figs. 6 and 8 the applied anode voltages 58 and 64 of thyratrons 16 and 17 are likewise 180 degrees out of phase with one another, and are also positioned 90 degrees out of phase with either of the anode voltages 46 and 52 of thyratrons 14 and 15 by virtue of the phase difference between the voltages appearing across the secondary windings 6 and 7 as previously indicated. As in the case of thyratron 14, thyratrons 15, 16 and 17 are supplied with applied grid voltages 54, 60 and 66 which intersect the respective critical grid voltage curves 53, 59 and 65 at points 55, 61 and 67, respectively. Hence, each of the tubes is caused to conduct for a period of time during each cycle of applied anode voltages 52, 58 and 64. Again the resulting anode currents 57, 63 and 69 are of short duration as illustrated in Figs. 5, 7 and 9, resulting in low average currents being supplied to the motor 38. Due to the phase displacement between the applied anode voltages 52, 58 and 64, each of the anode current surges 57, 63, and 69 through thyratrons 15, 16 and 17 is thus displaced in time from one another and also from the anode current surge 51 of thyratron 14, thereby precluding any two tubes from conducting during the same period of time. It may be observed that as the thyratrons 14, 15, 16 and 17 are made to conduct for periods of time exceeding 90 degrees through regulation of the applied grid voltages 48, 54, 60 and 66, conduction may be limited to those tubes arranged to supply current for only a particular direction of armature rotation by means of the grid control circuits 28 and 29.

In practicing this invention, the size of the direct current machines that may be feasibly operated from the thyratron circuit illustrated in Fig. 1 will be limited by the anode current capacity of the thyratrons employed. Hence, in applications where high driving currents are required it may be desirable to utilize a thyratron circuit as illustrated in Fig. 10 wherein the output of more than one full wave rectifier is made available to the armature of a motor for producing rotation in either direction.

In Fig. 10, a set of conductors 70, 71 and 72 is arranged to supply three phase alternating current, from a source not shown, to a plurality of transformer primary windings 73–78. Windings 73, 74 and 75 are delta connected to the conductors 70, 71 and 72, whereas the primary transformer windings 76, 77 and 78 are star or Y-connected to the conductors 70, 71 and 72. Each primary winding 73–78 has an associated secondary winding 79–84, respectively, and since primary windings 73–75 are delta connected and primary windings 76–78 are star connected the voltages induced in the secondary windings 79–84 will be displaced in phase by 30 degrees from one another. The voltages across the secondary windings 79–81 may be vectorially designated, $V_{79} \angle 0°$, $V_{80} \angle 240°$ and $V_{81} \angle 120°$, and the voltages appearing across the secondary windings 82–84 may be designated $V'_{82} \angle 330°$, $V'_{83} \angle 210°$ and $V'_{84} \angle 90°$.

A pair of thyratrons is associated with each of the secondary windings 79–84 to form a full wave rectifier, of a type described in connection with Fig. 1. For example, from opposite ends of the secondary winding 79 electrical connections are made through interposed fuses 85 to the anode terminals 86 and 87 of thyratrons 88 and 89, and the cathode terminals 90 and 91 are joined to one another by means of conductors 92 and 93 as well as a cathode connecting conductor 94. The grids 95 and 96 of thyratrons 88 and 89, respectively, are supplied from a grid control circuit 97, which may be of the type heretofore described and which does not form a part of this invention. A connecting lead 98 joins the grid control circuit 97 to the conductor 94.

Each of the secondary windings 80–84 is associated with a pair of parallel connected thyratrons to thus form a full wave electrical valve network or rectifier which is identically similar to the network comprising secondary winding 79 together with the thyratrons 88 and 89. Therefore, referring only briefly to the full wave electrical valve networks or rectifiers comprising thyratrons 99–108 it may be observed that thyratrons 99 and 100 each have an anode connection with one end of the secondary winding 80 through interposed fuses 85, and are connected at their cathodes to the conductor 94; and thyratrons 101 and 102 each have an anode connection with one end of the secondary winding 81 through fuses 85, and are connected at their cathodes to the conductor 94. Similarly, thyratrons 103 and 104 each have an anode connection with one end of the secondary winding 82 through fuses 85, and are connected at their cathodes to a different cathode connecting conductor 109; thyratrons 105 and 106 each have an anode connection with one end of the secondary winding 83 through fuses 85 and are connected at their cathodes to the conductor 109; and thyratrons 107 and 108 each have an anode connection with one end of the winding 84 through fuses 85, and are connected at their cathodes to conductor 109. Suitable grid control circuits 110–114 are also associated with the various pairs of thyratrons, namely, 99 and 100, 101 and 102, 103 and 104, 105 and 106, and 107 and 108, respectively to control the conduction of the tubes.

A comparison with Fig. 1 will indicate that the individual full wave rectifiers illustrated in Fig. 10, each consisting of a pair of thyratrons, a secondary winding and cathode connections, are operatively similar to the full wave rectifiers illustrated in Fig. 1 with the exception that the current transformers 8 have been deleted from the circuits in Fig. 10 for purposes of clarity. From the cathode connecting conductor 94, a lead 115 extends to a connection with an armature terminal 116 of a reversible direct current motor 117 having a separately excited field 152, and from the cathode connecting conductor 109 a lead 118 extends to a connection with another armature terminal 119 of the motor 117. Finally, a lead 120 cooperatively joins center tap terminals 121, 122 and 123 of the secondary windings 79, 80 and 81, respectively, to the armature terminal 119, while a lead 124 cooperatively joins center tap terminals 125, 126 and 127 of the windings 82, 83 and 84, respectively, to the armature terminal 116.

Thus, it is to be observed that two sets of thyratrons are employed to supply current to the motor 117 for either direction of armature rotation, each set comprising three full wave electrical valve networks or rectifiers joined in parallel to provide an output current which is approximately three times that available from the circuit illustrated in Fig. 1.

Figs. 11–22, inclusive, are curves of approximate anode voltages 128–139 as such voltages may appear across the anode and cathode terminals of the thyratrons 88, 89 and 99–108, respectively, during a given period of time. There are also illustrated, by means of shading, anode currents 140–151 which may flow when suitable grid turn on signals are applied by the grid control circuits 97 and 110–114. Each of the various tubes is shown in Figs. 11–22 to be in a state of conduction for a brief period of time during a complete cycle of anode voltage, which condition may prevail when the driven motor 117 is at or near standstill and currents are being simultaneously supplied to it for both directions of rotation.

Referring again to Fig. 10, for producing rotation in one direction a current flows from the thyratrons 88, 89 and 99–102 through the cathode connecting conductor 94, through lead 115, through the motor 117, and returns by means of lead 120 to the center tap connections 121, 122 and 123 of windings 79, 80 and 81. For oppositely directed rotation, a current flows from the thyratrons 103–108 through the conductor 109, through lead 118, through the motor 117, and returns by means of lead 124 to the center tap connections 125, 126 and 127 of windings 82, 83 and 84. With the two sets of thyratrons thus connected to supply direct currents of either direction through the direct current motor 117, it is imperative that tubes in only one of the two sets be allowed to conduct at any instant of time in order to avoid the formation of paths for destructive circulating currents flowing between the sets. For example, if tube 88 in the set comprising thyratrons 88, 89 and 99–102 is in a state of conduction simultaneously with tube 103 in the set comprising thyratrons 103–108, a circulating current path which by-passes the motor 117 is established through the thyratron 88, conductor 94, lead 115, lead 124, secondary winding 82, thyratron 103, conductor 109, lead 118, lead 120, and winding 79 which is connected to the thyratron 88.

With the voltages across the secondary windings 79–84 displaced from one another by 30 degrees, as hereinbefore indicated, the anode voltages 128–139 appearing across the various tubes 88, 89 and 99–108 are displaced in phase from one another by 30 degrees, as illustrated in Figs. 11–22. Accordingly, the anode currents 140–151 are also shifted in phase from one another by 30 degrees, hence only a single thyratron may be conducting at any instant of time when the firing angles of the various tubes 88, 89 and 99–108 are less than one-twelfth of a cycle or 30 degrees in duration. Thus, the formation of circulating current paths between the two sets of tubes is entirely avoided at relatively small conduction angles. During periods of operation when the firing angles of the tubes are necessarily greater than 30 degrees, the grid control circuits 97 and 110–114 may be regulated to limit conduction to thyratrons in only one of the two sets of tubes.

Various other arrangements and phase shifting apparatus may be employed to provide voltages of staggered initial phases adaptable for use in the practice of this invention without departing from the spirit of the invention which is limited only by the scope of the appended claims.

We claim:

1. A current controlling apparatus for supplying reversible current to a direct current machine, the combination comprising: first and second externally controlled full wave rectifiers having input and output sides, a voltage phase orientating network connectible between the lines of a polyphase source and the input sides of said rectifiers to provide voltages of different phases at said rectifiers, circuit connections joining the output side of said first rectifier to the input side of said second rectifier and joining the output side of said second rectifier to the input side of said first rectifier, and supply terminals joined to the output sides of both of said rectifiers adapted for connection at either side of the direct current machine.

2. In a current controlling apparatus for supplying reversible current to a direct current machine the combination comprising: a pair of transformers having primary windings connectible to a power source and secondary windings each having a pair of end connections and presenting voltages out of phase with one another; a first pair of unidirectional current valves each having a control element for varying the current passing therethrough, said valves being connected with like terminals of each joined to the ends of a secondary winding and with the opposite terminals joined to one another to provide a first full wave rectifier having input and output sides; a second pair of unidirectional current valves each having a control element for varying the current passing therethrough, said valves being connected with like terminals of each joined to the ends of a secondary winding and with the opposite terminals joined to one another to provide a second full wave rectifier having input and output sides; first supply leads for joining the output side of the first rectifier to a first side of a direct current machine, and for joining the input side of said first rectifier to a second side of the machine; and second supply leads for joining the output side of the second rectifier to the second side of the machine and for joining the input side of the second rectifier to the first side of the machine.

3. In a direct current motor control apparatus adapted for connection between the lines of a polyphase alternating current source and a reversible direct current motor, the combination of: a plurality of transformer primary windings connectible to said source to receive voltages each of a different phase angle; a plurality of full wave rectifying networks having input and output sides, each of said networks comprising a transformer secondary winding associated with one of said primary windings and a pair of electrical valves having input, output, and control terminals, each of said valve input terminals being joined to one side of the secondary winding and said valve output terminals being joined together; connections adapted to join the output sides of at least one of said networks to a first side of the motor and to join the input sides of the same networks to a second side of the motor; further connections adapted to join the output sides of the other of said networks to the second side of the motor and to join their input sides to the first side of the motor; and control means connected to said control terminals to regulate the conduction of all of said valves.

4. In a current controlling apparatus for supplying reversible currents to a direct current machine the combination comprising: a pair of transformer primary windings joined in T-connection and being connectible to the lines of a three phase alternating current source; first and second full wave rectifying networks having input and output sides, each of said networks including a transformer secondary winding associated with one of said primary windings and a pair of electrical valves having input, output and control terminals, said input terminals being joined to opposite sides of said secondary winding and said output terminals being joined together; connections for joining the output side of the first rectifying network to a first side of a direct current machine and for joining the input side of said first network to a second side of the machine; further connections for joining the output side of the second network to the second side of the machine and for joining the input side of the network to the first side of the machine; and means connected to said control terminals to regulate the conduction of all of said valves.

5. In a current controlling apparatus for supplying reversible currents to a direct current machine the combination of: a set of Y-connected transformer primary windings connectible to a three phase alternating current source; a set of delta connected transformer primary windings also connectible to said source, a plurality of full wave rectifiers having input and output sides, each rectifier comprising a transformer secondary winding arranged in transformer relationship with one of said primary windings and a pair of electrical valves having input, output and control terminals, said input terminals being joined to opposite sides of said secondary winding and said output terminals being joined together; connections for joining the output sides of at least one of said rectifiers to a first side of the machine and for joining the input sides thereof to a second side of the machine; further connections for joining the output sides of the remaining rectifiers to the second side of the machine and for joining the input sides thereof to the first side of the machine; and means connected to said control terminals to regulate the conduction of all of the valves.

6. In a direct current control apparatus the combination comprising: a first rectifier circuit having a pair of voltage input terminals, a pair of unidirectional current valves with a like polarity side of each connected together to form a first rectifier output terminal and with the opposite polarity sides each connected to one of said voltage input terminals, and a second output terminal providing a current path to the polarity sides of the valves connected to the voltage input terminals; a second rectifier circuit having a pair of voltage input terminals, a pair of unidirectional current valves with a like polarity side of each connected together to form a first rectifier output terminal and with the opposite polarity sides each connected to one of said voltage input terminals, and a second output terminal providing a current path to the polarity sides of the valves connected to the voltage input terminals; and phase orientating circuit means having power input connections for being joined with an A.C. voltage supply, and a pair of voltage outputs that are each across the input terminals of one of said rectifiers to present A.C. voltages at such input terminals which are out of phase with one another.

7. An apparatus in accordance with claim 6 wherein said phase orientating circuit means comprises a pair of transformer secondaries joined respectively across the input terminals of said rectifiers and primary windings coupled with the secondaries for causing out of phase voltages to be induced in said secondaries; and wherein the second output terminal of each rectifier is joined to a tap on the associated secondary winding.

References Cited in the file of this patent

UNITED STATES PATENTS 2,276,752     Willis _____ Mar. 17, 1942